July 11, 1950  J. G. KIRK, SR  2,514,700
SAW SET
Filed May 21, 1948

Inventor

James G. Kirk, Sr

By *Clarence A. O'Brien*
and *Harvey B. Jacobson*
Attorneys

Patented July 11, 1950

2,514,700

UNITED STATES PATENT OFFICE 2,514,700

SAW SET

James G. Kirk, Sr., Jackson, Miss., assignor to James A. Kerr, Jackson, Miss.

Application May 21, 1948, Serial No. 28,439

3 Claims. (Cl. 76—58)

This invention relates to a device for treating saws and has for its primary object to accurately and properly set the angle of the teeth of a saw, after the teeth have been sharpened, dressed or the like, so that the angular position of the teeth is correct.

Another important object of this invention is to provide a convenient and compact apparatus for adjusting the angular positioning of saw teeth, so that the teeth may be easily set on the proper interrelated angle relative to the body of the saw.

A meritorious feature of this invention resides in the provision of a body section, having means for accommodating and receiving the teeth of a saw, the body section being easily manipulated by an operator to bend the teeth, the saw being held in a suitable clamping device, such as a vise or the like.

Another meritorious feature of this invention resides in the provision of adjustable stop means, which are adapted to engage the sides of a saw and to limit or govern the amount of set put in the teeth.

Another important feature of this invention resides in the provision of convenient means for adjusting the position of stop levers, so that the levers by engaging the sides of the saw will determine and control the angular positioning of the teeth.

These and ancillary objects and other meritorious features are attained by this invention, a preferred embodiment of which is set forth in the following description and illustrated in the accompanying drawings, wherein.

Figure 1:
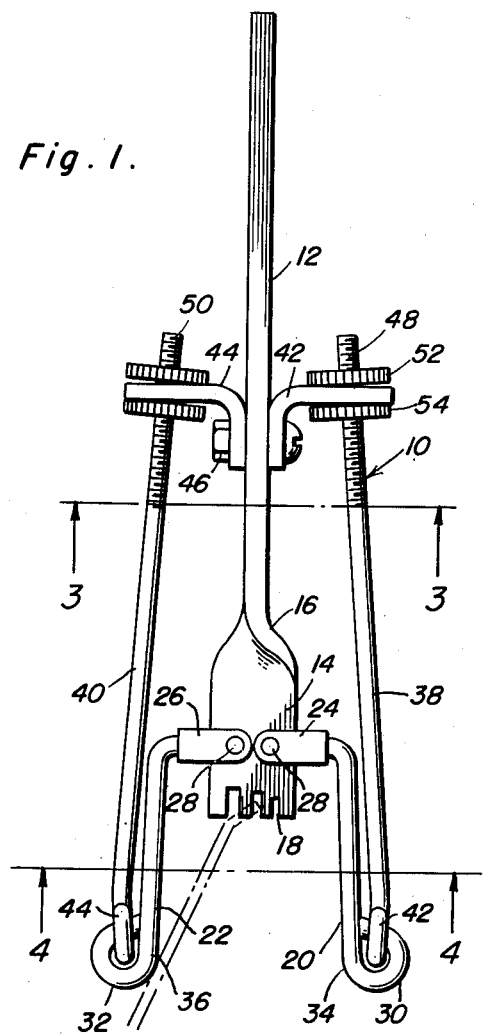
Figure 1 is a front elevational view of this invention.
Figure 2:
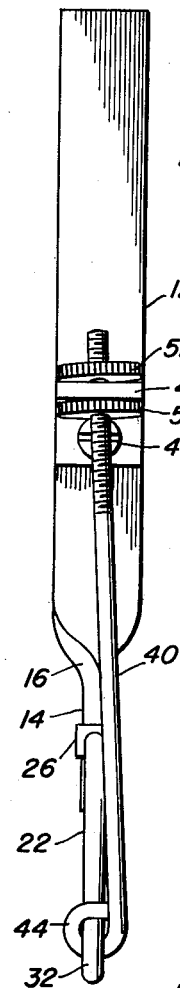
Figure 2 is a side elevational view thereof.
Figure 3:
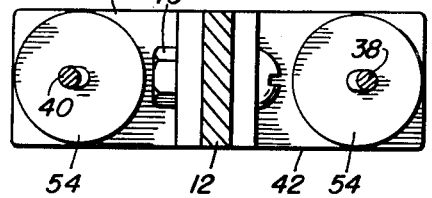
Figure 3 is a cross sectional view taken substantially on the plane of the line 3—3, and, Figure 4 is a transverse sectional view taken substantially on the plane of line 4—4 of Figure 1.
Figure 4:
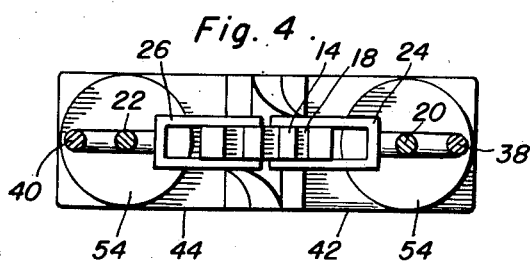

Referring now more particularly to the drawings, wherein similar characters of reference designate corresponding parts throughout, this invention generally designated by the character reference 10 comprises an elongated bar 12, having one end 14 twisted as at 16. The end section 14, hereinafter referred to as the body section, is disposed in a plane at approximately 90° to the plane of the major portion of the elongated bar 12. The bar 12 is adapted to serve as a handgripping member, whereby movement may be transmitted to the body section. A plurality of slots or openings 18 are formed in the end of the body section 14 for receiving and accommodating the teeth of a saw. The slots or openings 18 are preferably formed in varying dimensions, so that different thicknesses of saws may be accommodated.

Suitable means is provided for limiting the angular positioning of the teeth, received in the slots 18, the same being bent by exerting pressure on the handle 12. The means may comprise any type of stop device, which would companionly project from the sides of the body to extend beyond the slots 18 on each end thereof. By way of example, stop levers 20 and 22 are shown as pivotally secured to the body section 14 by means of U-shaped brackets 24 and 26. The brackets 24 and 26 are pivoted as at 28 to the body section for pivotal movement on the sides of the body section, as seen in Figure 1 of the drawings. The ends of the stop levers 20 and 22 are suitably secured to the closed end of the U-shaped brackets, being formed integral therewith, while the opposite ends of the levers are coiled upon themselves forming loop ends 30 and 32. A rounded edge 34 and 36 of the levers is adapted to abut against and restrain the sides of a saw, as seen in Figure 1, wherein the saw is shown in phantom lines.

Of course, suitable means is provided for maintaining the stop levers in the desired position so as to regulate the area of movement of the saw and thereby govern the amount of set in the teeth. Preferably, the means is formed adjustable in conformance with the pivoting of the stop levers to the body section.

To carry out this purpose, a pair of adjusting rods 38 and 40 are provided and have loop or hook ends 42 and 44 which are received within the loop ends 30 and 32 of the stop levers. The adjusting rods 38 and 40 extend upwardly and are adjustably received within apertures formed in a pair of angle brackets 42 and 44. The brackets 42 and 44 are commonly secured at one end to substantially the medial portion of the bar 12 by means of a bolt assembly 46. The opposite ends of the brackets extend laterally in opposite directions and are suitably apertured to receive the threaded ends 48 and 50 of the adjusting rods 38 and 40. Cooperating locking means, such as locking nuts 52 and 54 are received on the threaded end of the rods and disposed on opposite sides of the laterally extending portion of the brackets 42 and 44.

Thus, the adjusting rods 38 and 40 may be moved upwardly and downwardly and held in the desired position by the locking elements and said movement is transmitted to the stop levers 20 and 22 which pivot around a pivot point 28 of the attaching U-shaped brackets 24 and 26. Accordingly, when the body portion of the saw is restrained in a vise or other clamping means, the notches 18 are positioned so as to engage the teeth of the saw and the handle 12 is moved so that the teeth are bent. The angular positioning of the teeth is controlled by the engagement of the stop levers with the sides of the saw, so that only the desired amount of set can be imparted to the saw.

Thus, it can be seen that there has been provided a compact and useful device, which may be easily and conveniently employed for accurately and properly setting the angle of the teeth of a saw.

However, since many other purposes and objects of this invention will become apparent to those skilled in the art, upon a perusal of the foregoing description, in view of the accompanying drawings, it is to be understood that certain changes may be effected therein, as coming within the spirit of the invention and the scope of the appended claims.

Having described the invention, what is claimed as new is:

1. A device for setting the angle of saw teeth, comprising a flat body section, slots in one end of the body section for receiving the teeth of a saw, a flat elongated bar extending from the other end of the body section in a plane approximately 90° to the plane of the body section, complementary stop levers pivotally mounted on the body section and extending forwardly beyond the slotted end thereof, said stop levers being adapted to engage the sides of a saw and limit the angular positioning of the teeth and means carried by said bar for adjusting the stop levers relative to each other.

2. A device for setting the angle of saw teeth, comprising a flat body section, slots transversely formed in one end of the body section, said slots being of varying widths for receiving the teeth of a saw, a flat elongated handle bar extending from the other end of the body section, complementary stop levers pivotally mounted on the body section and extending forwardly beyond the slotted end thereof, a pair of apertured plates laterally extending in opposite directions from the bar, adjusting rods carried by the plates and pivotally connected to the stop levers for locking the levers in adjusted diverging positions relative to the slotted end of the body section.

3. The combination of claim 2, wherein the adjusting rods are slidably positioned in the plates and means is disposed above and below the plates for locking the rods in selected position.

JAMES G. KIRK, Sr.

REFERENCES CITED

The following references are of record in the file of this patent:

UNITED STATES PATENTS

| Number | Name | Date |
|---|---|---|
| 209,222 | Buell | Oct. 22, 1878 |
| 499,789 | Kardell | June 20, 1893 |
| 1,128,443 | Hampton | Feb. 16, 1915 |
| 1,485,114 | Frisk | Feb. 26, 1924 |
| 1,545,011 | Racine | July 7, 1925 |
| 1,790,751 | Johnson | Feb. 3, 1931 |